(12) United States Patent  (10) Patent No.: US 7,463,722 B2
Swam et al.  (45) Date of Patent: Dec. 9, 2008

(54) SPLITTER SYSTEM WITH TEST ACCESS

(75) Inventors: Steve Swam, Shakopee, MN (US); Michael Hanahoe, Eden Prairie, MN (US); Jennifer Miller, Farmington, MN (US); Todd Bade, Inver Grove Heights, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1444 days.

(21) Appl. No.: 10/277,172

(22) Filed: Oct. 18, 2002

(65) Prior Publication Data

US 2004/0088171 A1 May 6, 2004

(51) Int. Cl.
*H04M 1/24* (2006.01)
*H04M 3/08* (2006.01)
*H04M 3/22* (2006.01)

(52) U.S. Cl. .................. 379/15.01; 379/9; 379/22; 379/27.07; 379/93.05; 379/93.07; 379/399.01

(58) Field of Classification Search ............... 379/1.01, 379/1.03, 8, 9, 9.06, 22.04, 22.05, 26.01, 379/27.01, 27.06, 28, 29.01, 29.05, 32.04, 379/399.01
See application file for complete search history.

(56) References Cited

U.S. PATENT DOCUMENTS

| | | | |
|---|---|---|---|
| 6,421,322 B1 | 7/2002 | Koziy et al. | |
| 6,438,226 B1 * | 8/2002 | Guenther et al. | 379/413.04 |
| 6,574,309 B1 * | 6/2003 | Chea et al. | 379/9 |
| 6,594,343 B1 * | 7/2003 | Duffie et al. | 379/1.01 |
| 6,778,778 B1 * | 8/2004 | Richards et al. | 398/14 |
| 6,826,280 B1 * | 11/2004 | Sajadi et al. | 379/413.04 |
| 6,917,683 B2 * | 7/2005 | Singaliese et al. | 379/413.04 |
| 7,103,150 B2 * | 9/2006 | Witty et al. | 379/26.01 |
| 7,227,928 B2 * | 6/2007 | Valve | 379/27.02 |
| 2002/0118820 A1 * | 8/2002 | Sinclair et al. | 379/399.01 |
| 2003/0043970 A1 * | 3/2003 | Witty et al. | 379/1.03 |
| 2004/0086110 A1 * | 5/2004 | Singaliese et al. | 379/429 |
| 2004/0120508 A1 * | 6/2004 | Sajadi et al. | 379/399.01 |
| 2005/0018818 A1 * | 1/2005 | Arias et al. | 379/27.01 |
| 2007/0064879 A1 * | 3/2007 | Witty et al. | 379/22.06 |

FOREIGN PATENT DOCUMENTS

| | | |
|---|---|---|
| EP | 0 909 102 A2 | 4/1999 |
| WO | WO 01/45432 A1 | 6/2001 |
| WO | WO 01/80574 A3 | 10/2001 |

* cited by examiner

*Primary Examiner*—Binh K Tieu
(74) *Attorney, Agent, or Firm*—Merchant & Gould P.C.

(57) ABSTRACT

A splitter unit including a chassis containing splitter cards. The splitter unit includes a central processing unit mounting location. The splitter unit also includes test access devices that are inactive when the central processing unit mounting location is vacant. The splitter unit is configured such that the splitter cards provide passive signal splitting even when the central processing unit mounting location is vacant.

28 Claims, 17 Drawing Sheets

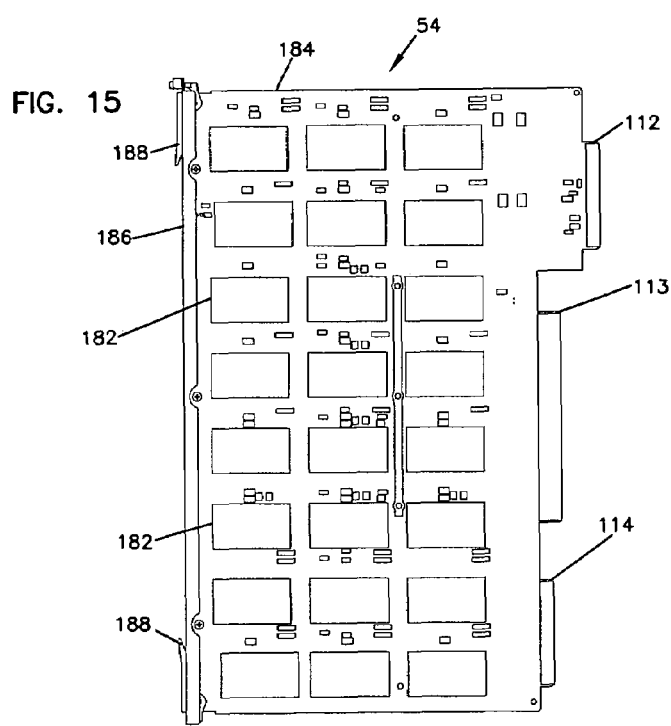
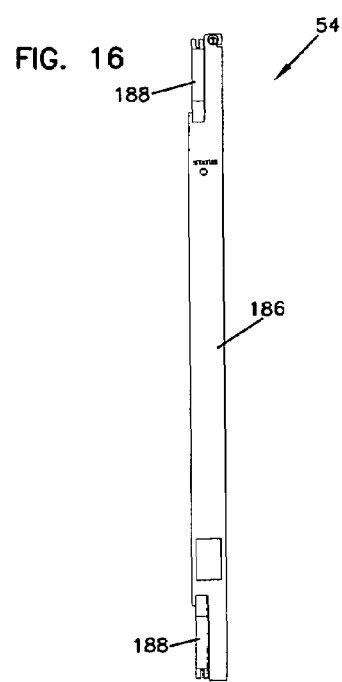

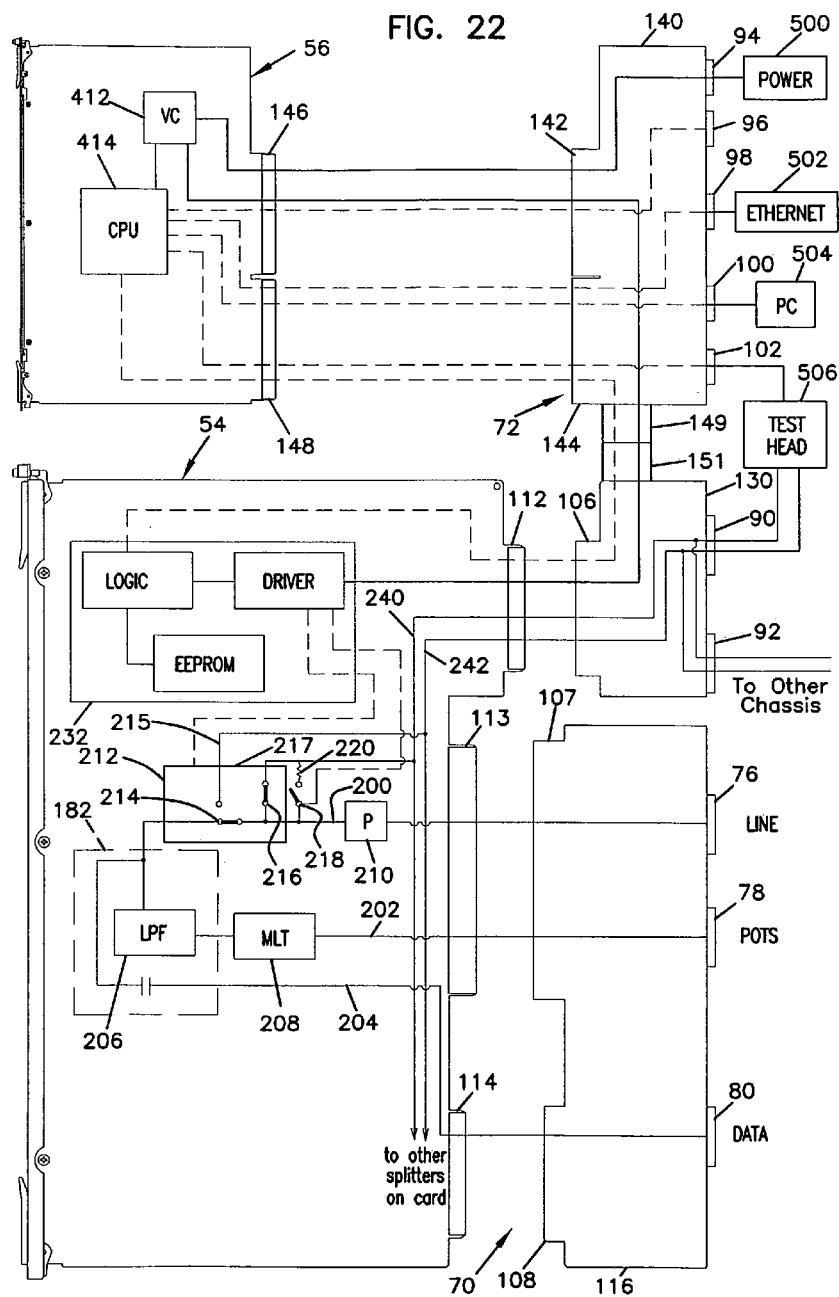

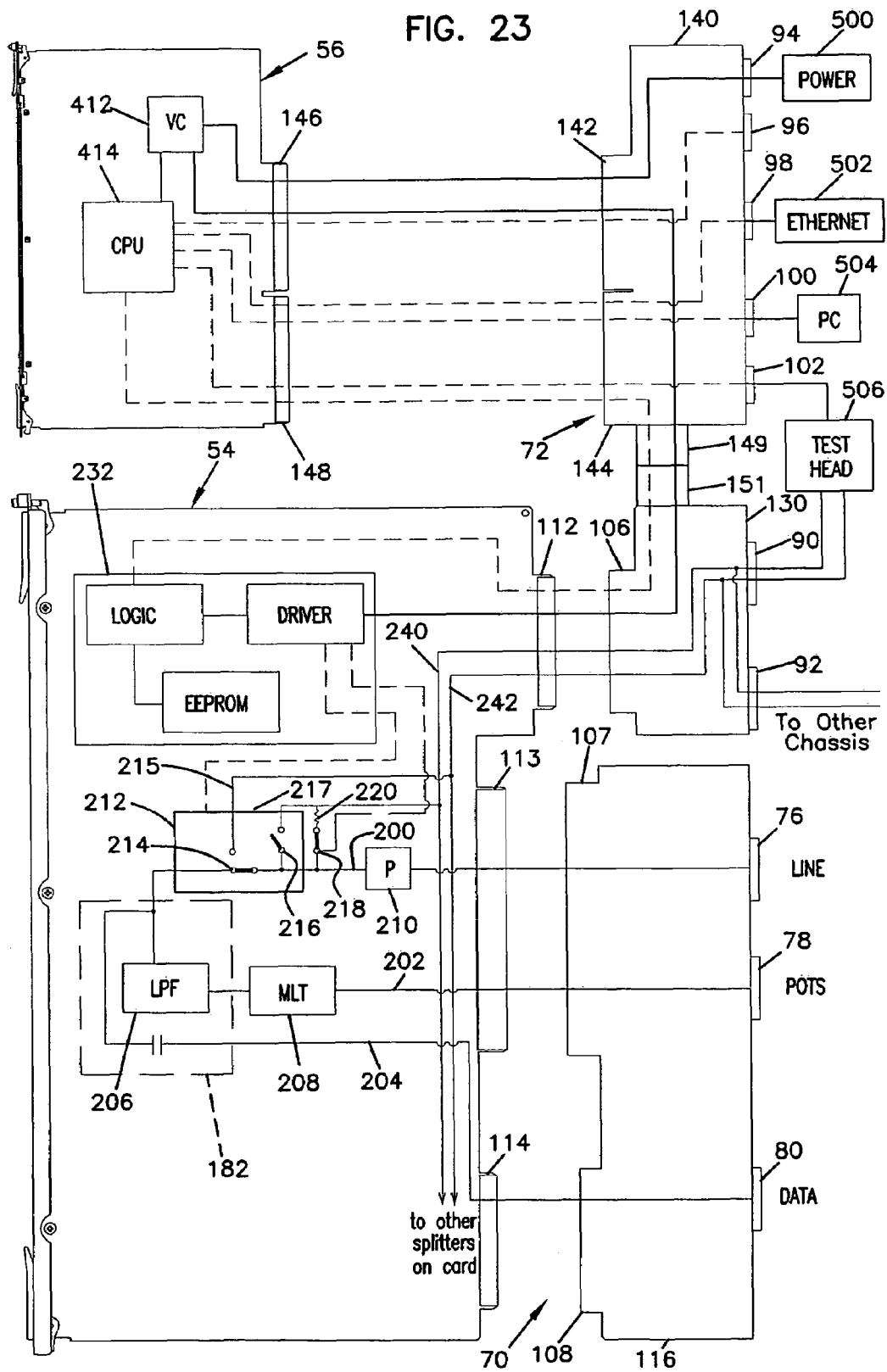

SPLITTER SYSTEM WITH TEST ACCESS

FIELD OF THE INVENTION

The present invention relates generally to telecommunications equipment. More particularly, the present invention relates to telecommunications equipment used in twisted pair telephone carrier systems.

BACKGROUND OF THE INVENTION

Telecommunications systems for transmitting voice and data to and from subscribers (i.e., residences and businesses) are known. An exemplary telecommunications system 10 is schematically shown in FIG. 1. The system 10 includes a Main Distribution Frame 12 (MDF) for connecting digital subscriber lines 13 (DSLs) to internal lines 14 within a telephone server's central office 15. The central office 15 frequently includes a DSLAM 18 (Digital Subscriber Line Access Multiplexer) and a voice switch 19. The DSLAM 18 transmits data to and receives data from a communications network/backbone 21. The voice switch 19 transmits voice signals to and receives voice signals from a communications network/backbone 23. The networks 21 and 23 can be dedicated lines that are part of the same network. POTS splitter devices 16 (i.e., Plain Old Telephone Service splitter devices) are used at the central office 15 to combine data signals from the DSLAM 18 with voice signals from the voice switch 19. By combining the signals, the signals can be simultaneously routed to a subscriber 25 through a single DSL 13. Signals transmitted from subscribers 25 to the central office 15 are also routed through the POTS splitter devices 16. At the POTS splitter devices 16, the signals are split and directed to the DSLAM 18 and the voice switch 19. Typically, the splitter devices 16 include low pass filters for removing the data content from any signals transmitted from the splitter devices 16 to the voice switch 19. Since DSLAMs 18 frequently include high pass filters for removing the voice band, the splitter devices 16 usually do not include filters for filtering the voice content from the signals transmitted to the DSLAM 18.

The ability to provide DSL service to a customer is dependent upon the quality of the outside plant copper lines providing telephone service to the customer. Before providing service, it is important "qualify" the copper lines to ensure that an acceptable quality of service can be delivered. This process is known as loop qualification. In addition to loop qualification, it is also important for service providers to have fault isolation capabilities. To perform loop qualification or fault isolation, the service provider typically dispatches a technician or utilizes a remote access and test device. Remote test access is desirable because it can eliminate repetitive technician dispatches and ensures timely fault restoration. Real estate is a premium in the central office environment. Thus, it is also desirable to conserve space by integrating test access devices into existing components in the service provider's central office.

SUMMARY

One inventive aspect of the present disclosure relates to a splitter device having test access devices that can be activated to provide remote test access capabilities. In one embodiment, the splitter device is configured to have passive splitter capabilities when the test access devices are inactive. If remote test access is desired, the splitter device can be upgraded by adding a central processing unit that activates the test access devices. This enables a customer to defer the costs associated with activating the test access devices until remote test access is required.

A variety of other inventive aspects of the disclosure are set forth in part in the description that follows, and in part will be apparent from the description, or may be learned by practicing the inventive aspects. The inventive aspects relate to individual features as well as combinations of features. It is to be understood that both the foregoing general description and the following detailed description are exemplary and explanatory only and are not restrictive of the invention as claimed.

BRIEF DESCRIPTION OF THE DRAWINGS

FIG. 15 is a side view of a splitter card that is a component of the splitter unit of FIG. 2;

FIG. 16 is a front view of the splitter card of FIG. 15;

FIG. 22 illustrates the schematic of FIG. 21 with the test relay switches switched from the normal positions to intrusive testing positions; and FIG. 23 illustrates the schematic of FIG. 21 with the relay switches oriented to provide non-intrusive signal monitoring.

Figure 1:
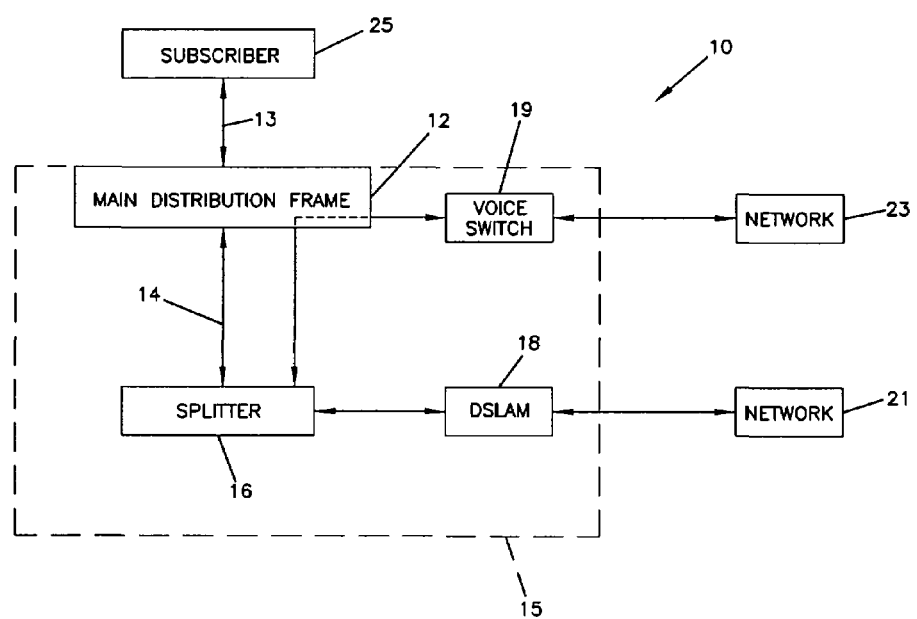
FIG. 1 is a schematic diagram of an exemplary prior art telecommunications system.
Figure 2:
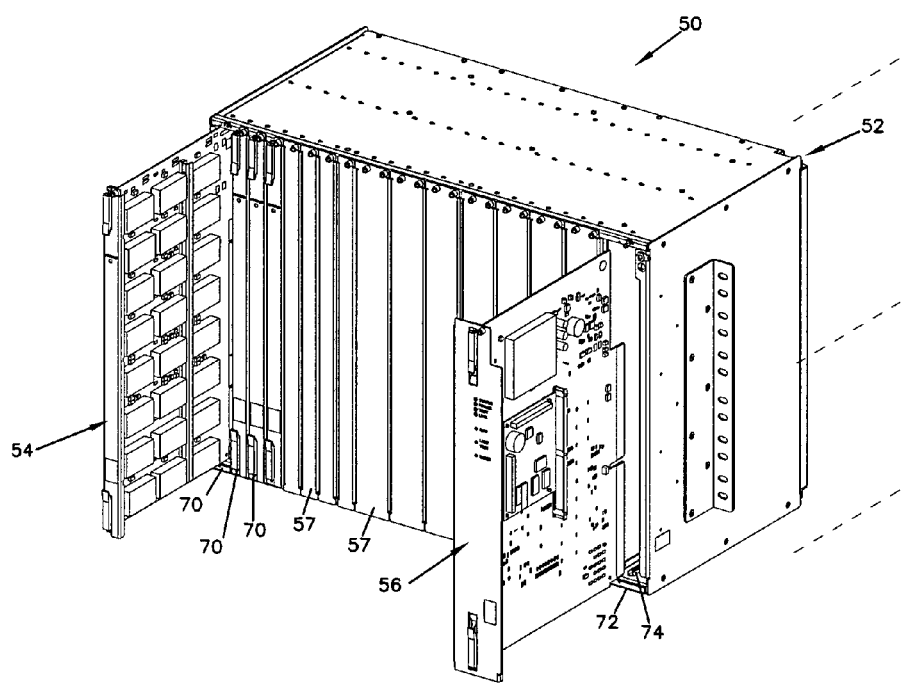
FIG. 2 is a front, perspective view of a splitter unit having inventive aspects in accordance with the principles of the present disclosure.
Figure 3:
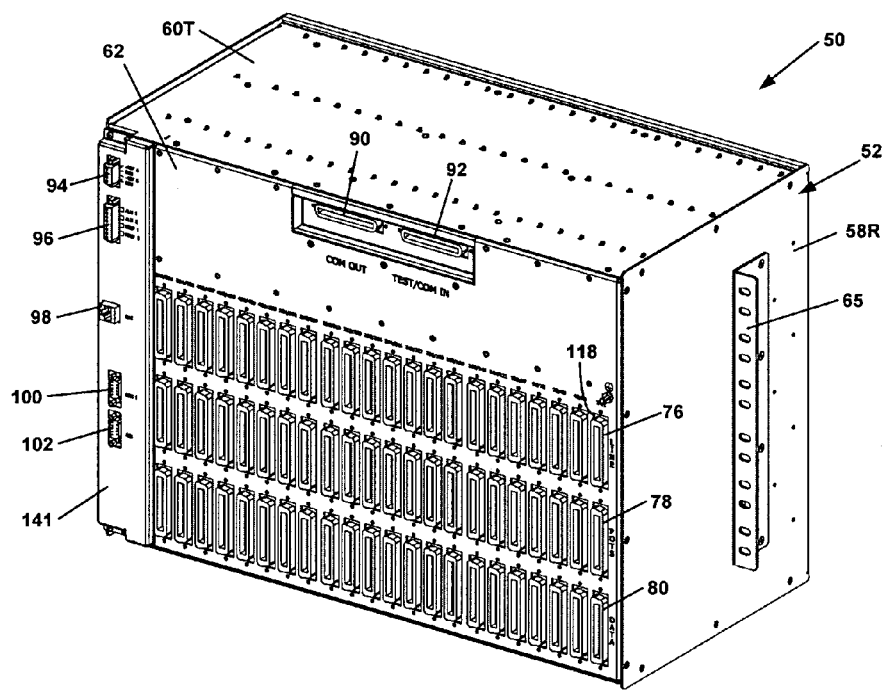
FIG. 3 is a rear perspective view of the splitter unit of FIG. 2.

While the embodiments disclosed herein are amenable to various modifications and alternative forms, specifics thereof have been shown by way of example in the drawings and will be described in detail below. It is to be understood, however, that the intention is not to limit the inventive aspects of the present disclosure to the particular embodiments described. On the contrary, the disclosed embodiments are merely examples of how certain inventive aspects may be practiced, and that other embodiments are not excluded.

DETAILED DESCRIPTION

In the following detailed description, references are made to the accompanying drawings that depict various embodiments in which the inventive aspects may be practiced. It is to be understood that other embodiments may be utilized, and structural and functional changes may be made without departing from the scope of the inventive aspects It will be appreciated that the various aspects of the present invention are applicable to a variety of telecommunications service options including, among other things, ADSL (Asymmetric Digital Subscriber Line), IDSL (Integrated Services Digital Network DSL), SDSL (Symmetric DSL) and VDSL (very high speed DSL) services.

Figure 4:
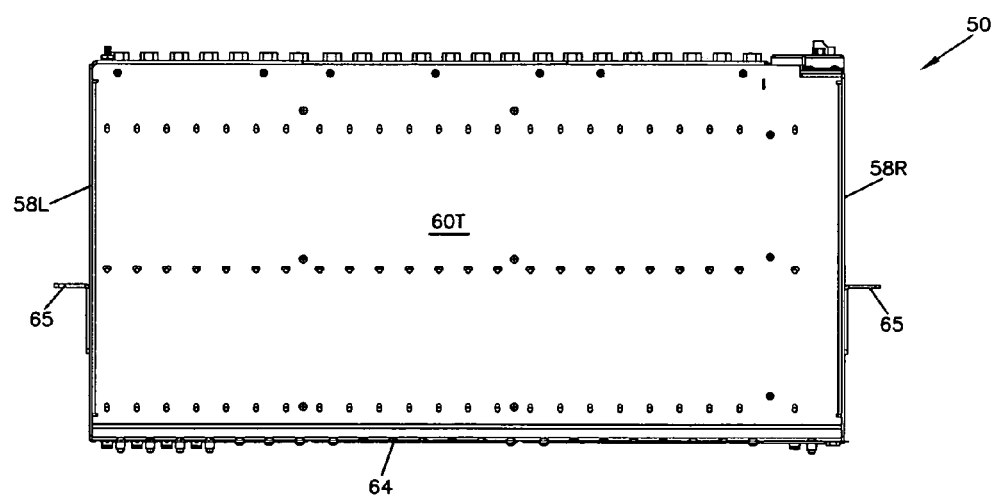
FIG. 4 is a top view of the splitter unit of FIG. 2.
Figure 5:
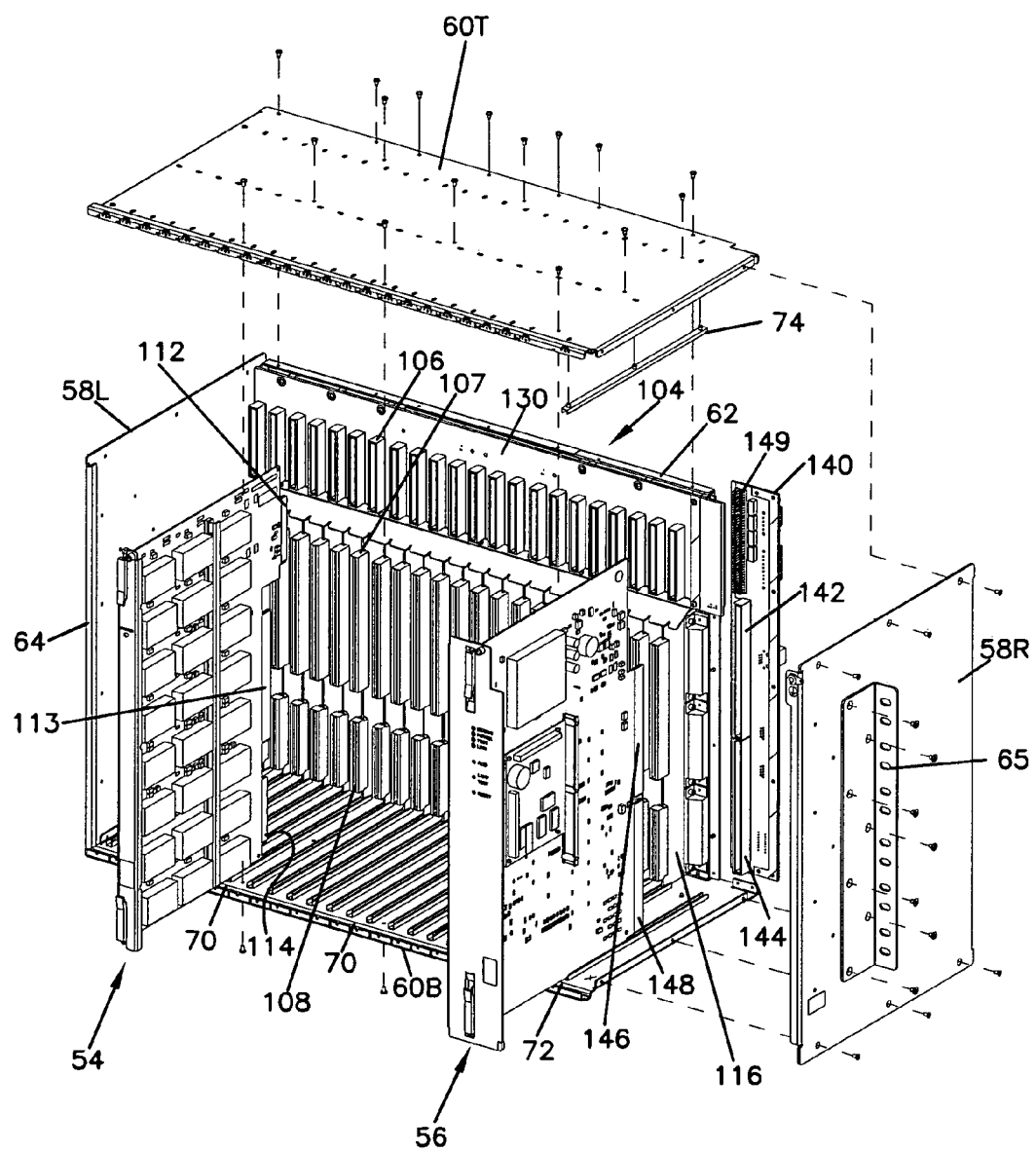
FIG. 5 is an exploded view of the splitter unit of FIG. 2 with a majority of the cards removed.

FIGS. 2-6 illustrate a splitter unit 50 having features that are examples of inventive aspects in accordance with the principles of the present disclosure. The splitter unit 50 includes a chassis 52 for holding a central processing unit (CPU) card 56 and a plurality of splitter cards 54. As best shown in FIG. 5, the depicted chassis 52 includes 22 splitter card mounting locations 70 and one CPU card mounting location 72. Top and bottom card edge guides 74 are provided at each of the card mounting locations 70, 72. It will be appreciated that in other embodiments the splitter card capacity can be varied.

Referring to FIG. 5, the splitter chassis 52 has a rectangular configuration defined by left and right walls 58L and 58R, top and bottom walls 60T and 60B, and rear wall 62. As best shown in FIG. 4, flanges 65 are provided on the left and right walls 58L, 58R for allowing the splitter unit 50 to be fastened (e.g., by screws or bolts) to a conventional rack, frame or cabinet. A front 64 of the chassis 52 is preferably open to allow for the insertion of the splitter cards 54 and the CPU card 56. When the chassis 52 is not fully loaded with splitter cards, blank panels 57 (see FIG. 2) can be used to close the open front 64 of the chassis 52. By removing the blank panels, additional splitter cards can be added to the chassis 52 as capacity requirements increase. A blank panel can be used to block the CPU card mounting location 72 when the CPU card mounting location 72 is vacant.

Figure 6:
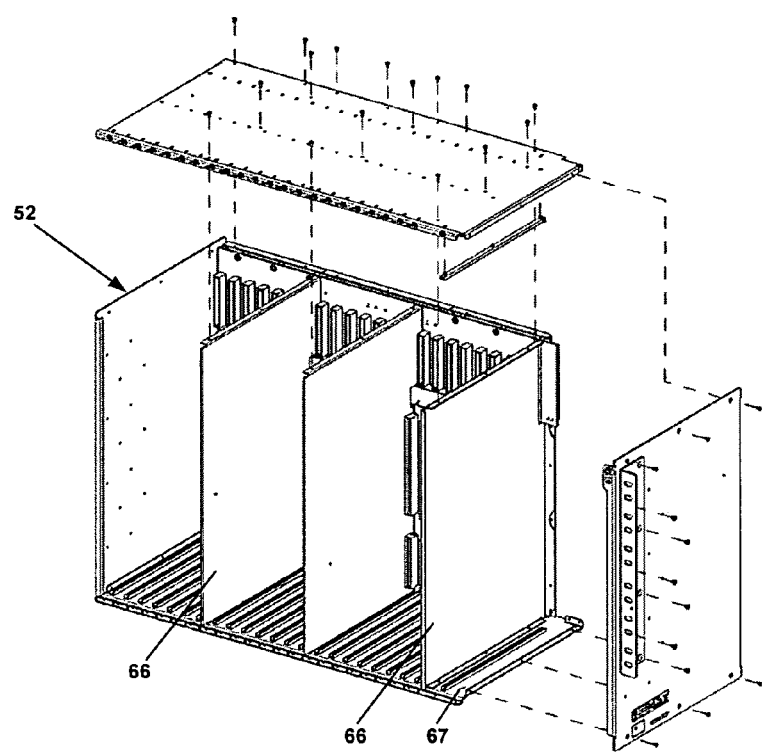
FIG. 6 is an exploded view of the splitter unit of FIG. 2 showing reinforcing dividers mounted within the chassis.

Referring to FIG. 6, the chassis 52 can also include reinforcing dividers 66 that segregate the interior of the chassis 52 into multiple compartments. In the embodiment of FIG. 6, a separate compartment 67 is provided that segregates the CPU card 56 from the splitter cards 54.

Figure 7:
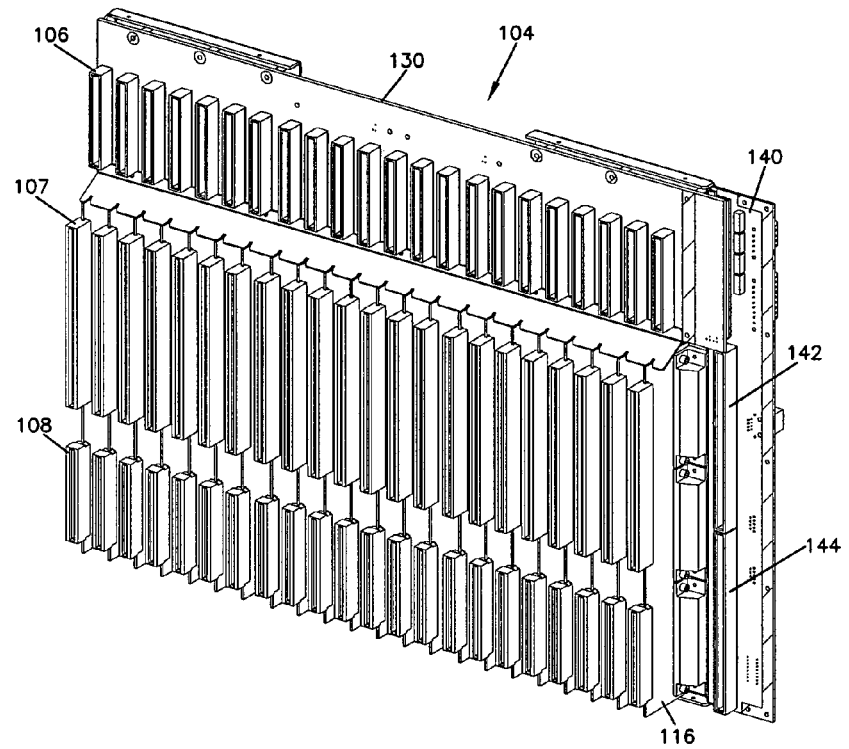
FIG. 7 is a front perspective view of a back plane of the splitter unit of FIG. 2.

Referring to FIGS. 5 and 7, the splitter unit 50 includes an interface back plane 104 having components for providing electrical connections with the splitter cards 54 when the cards 54 are mounted within the chassis 52. For example, each of the splitter card mounting locations 70 includes first, second and third interface connectors 106-108 arranged in a vertical column. In the depicted embodiment, the connectors 106-108 comprise card edge connectors. As shown in FIG. 5, the splitter cards 54 include first, second and third card edge extensions 112-114 that respectively align with the connectors 106-108. When the splitter cards 54 are fully inserted into the splitter card mounting locations 70, the card edge extensions 112-114 fit within their respective interface connectors 106-108 to provide an interface between the splitter cards 54 and the back plane.

Figure 8:
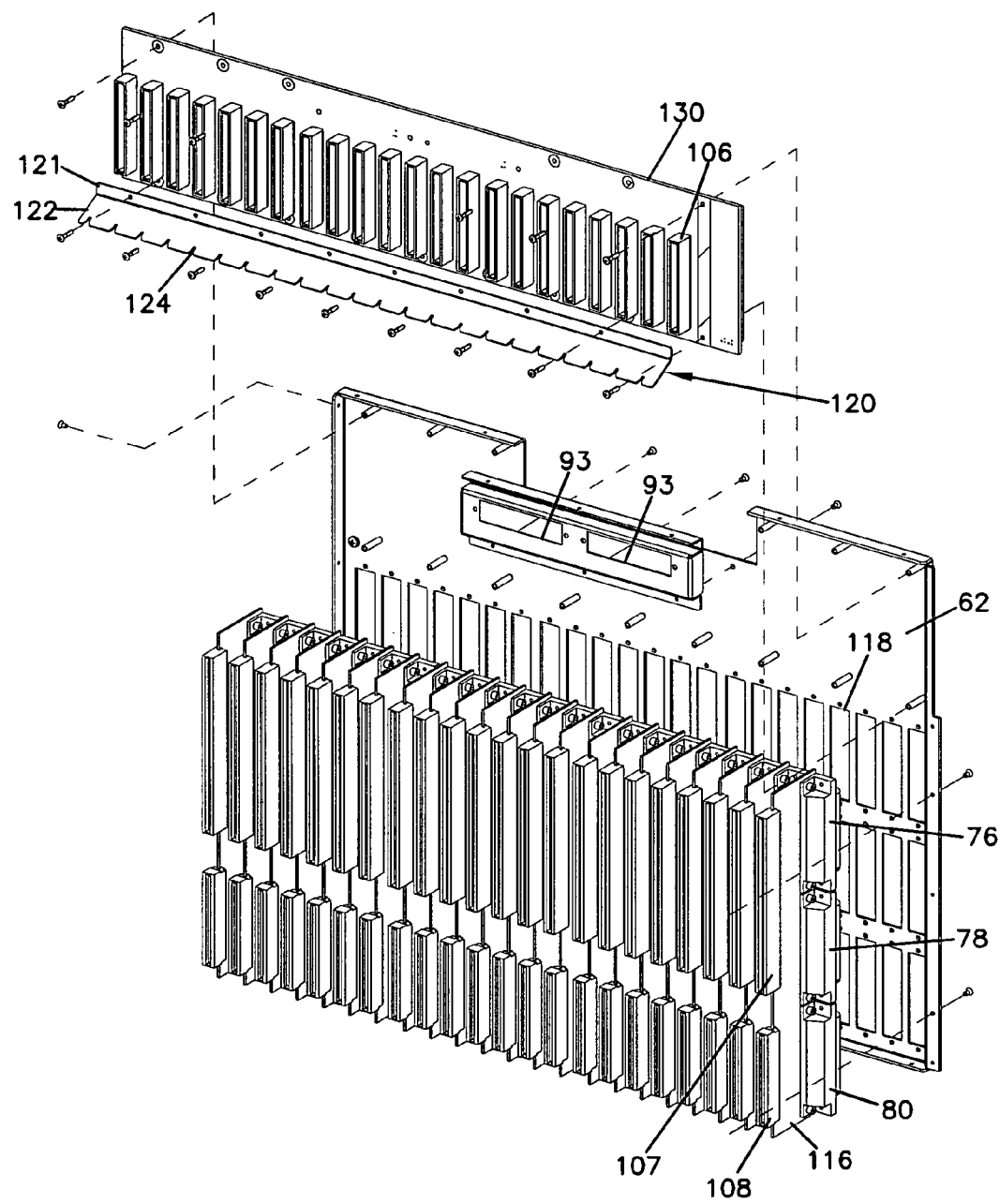
FIG. 8 is an exploded view of the back plane of FIG. 7.

Referring to FIG. 8, mini back plane circuit boards 116 are provided at each of the splitter card mounting locations 70. The mini back plane circuit boards 116 electrically connect the second and third interface connectors 107, 108 of each splitter card mounting location to a corresponding set of LINE, VOICE and DATA connectors 76, 78 and 80. The LINE connectors 76 can be used to provide interface locations for allowing the splitter unit 50 to interface with outside lines such as digital subscriber lines 13 (see FIG. 1). The VOICE connectors 78 (i.e. POTS connectors) can be used to provide interface locations for allowing the splitter unit 50 to interface with a voice switch such as voice switch 19 (see FIG. 1). The DATA connectors 80 can be used to provide interface locations for allowing the splitter unit 50 to interface with a DSLAM such as DSLAM 18 (see FIG. 1). In a non-limiting embodiment, the connectors 76, 78 and 80 can be RJ-21 connectors for use in providing connections with corresponding connectors provided on cables such as 25-pair twisted pair cables.

The mini back plane circuit boards 116 are aligned generally perpendicular relative to the rear wall 62 of the chassis 52. The interface connectors 107 and 108 are secured to front edges of the circuit boards 116. The LINE, VOICE and DATA connectors 76, 78 and 80 are fastened to the circuit boards 116 adjacent rear edges of the circuit boards 116. As shown in FIG. 8, the LINE, VOICE and DATA connectors 76, 78 and 80 mount within openings 118 defined by the rear wall 62 of the chassis 52. Fasteners are used to secure the connectors 77, 78 and 80 within the openings 118. When mounted within the openings, the connectors 76, 78 and 80 define an array of vertical columns and are accessible from a rear side of the chassis 52 (see FIG. 3).

To maintain alignment and spacing between the mini back plane circuit boards 116, a reinforcing bracket 120 (see FIG. 8) is secured (i.e., fastened) to the rear wall 62 of the chassis 52. The reinforcing bracket 120 includes a first portion 121 fastened to the rear wall 62 of the chassis 52, and a second portion 122 that angles forwardly and downwardly from the rear wall 62. The second portion 122 includes a plurality of notches 124. Each notch 124 receives and supports a top edge of a corresponding one of the mini back plane circuit boards 116.

Figure 20:
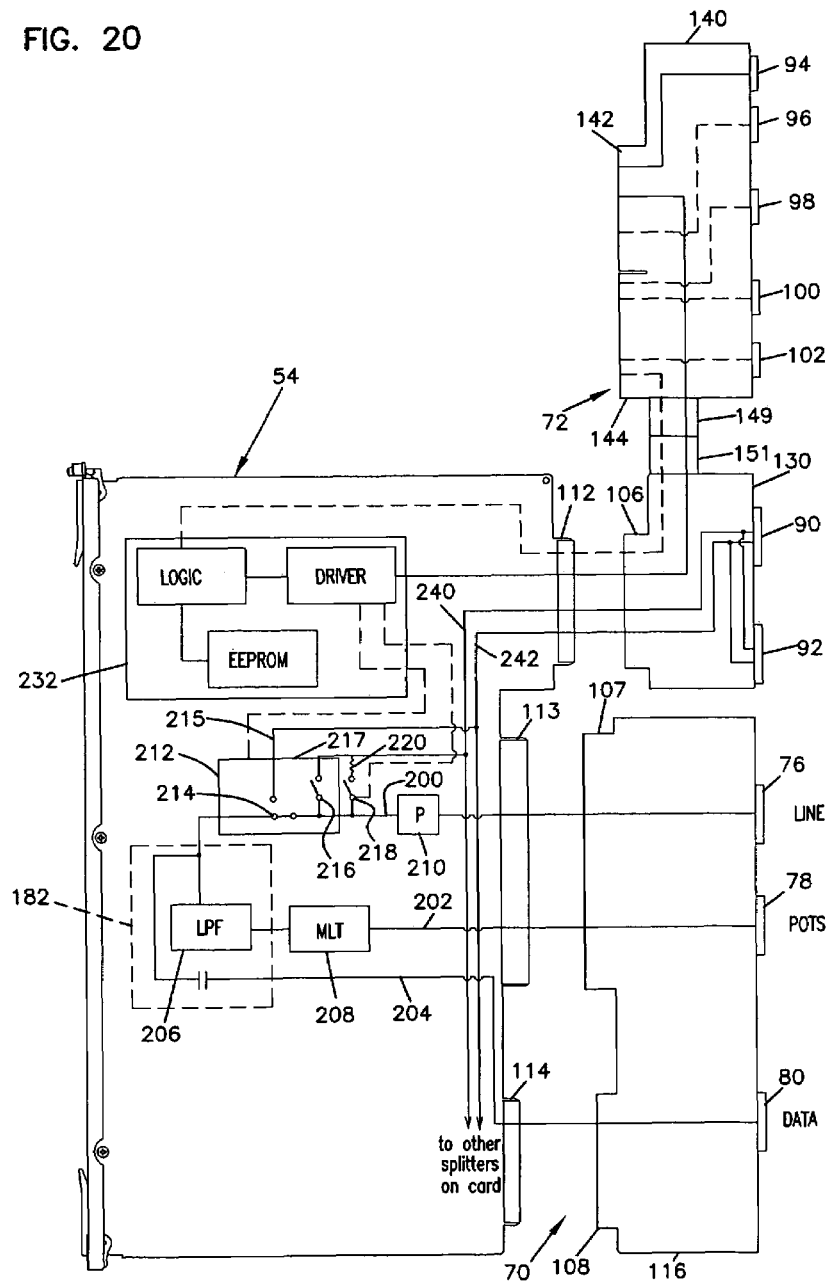
FIG. 20 is a schematic diagram of the splitter unit of FIG. 2 with the central processing unit card mounting location vacant.

It will be appreciated that the mini back plane circuit boards 116 include tracings for electrically connecting the sets of connectors 107 and 108 to their corresponding sets of LINE, VOICE and DATA connectors 76, 78 and 80. For example, FIG. 20 schematically shows a mini back plane circuit board 116 having connector 107 electrically to LINE and VOICE connectors 76 and 78, and connector 108 electrically connected to DATA connector 80. Mini back plane circuit boards 116 are also described in U.S. application Ser. No. 09/549,133, entitled "Splitter Architecture For A Telecommunications System" filed Apr. 13, 2000, which is hereby incorporated by reference in its entirety.

Figure 9:
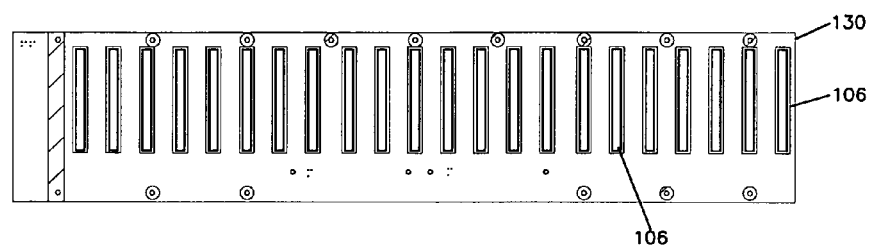
FIG. 9 is a front view of a distribution circuit board that is a component of the back plane of FIG. 7.
Figure 10:
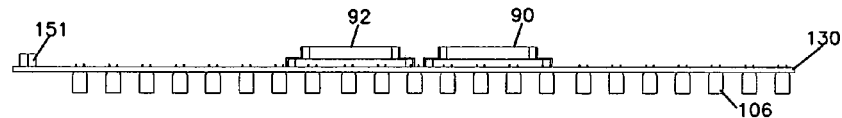
FIG. 10 is a top view of the distribution circuit board of FIG. 9.
Figure 11:
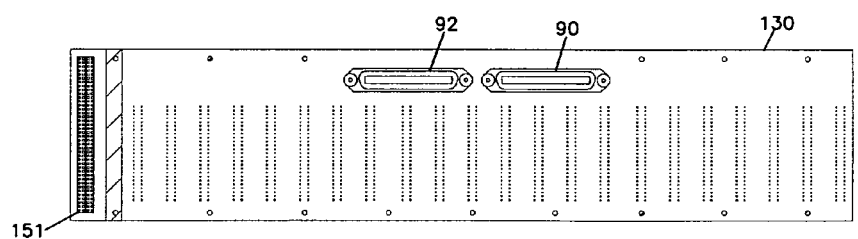
FIG. 11 is a rear view of the distribution circuit board of FIG. 9.

Referring again to FIG. 8, the interface back plane 104 also includes a distribution circuit board 130. The distribution circuit board 130 mounts within the chassis 52 at a location above the mini back plane circuit boards 116 and is preferably aligned parallel to the rear wall 62 of the chassis 52. The connectors 106 corresponding to each of the splitter card mounting locations 70 are mounted on a front side of a distribution circuit board 130 (see FIGS. 8-10). Test connectors 90 and 92 are mounted on a back side of the distribution circuit board 130 (see FIGS. 10 and 11).

As schematically depicted in FIG. 20, the distribution circuit board 130 includes tracings that electrically connect the connectors 106 to the test connector 90. As also shown schematically in FIG. 20, the distribution circuit board 130 can also include tracings for connecting the test connector 90 in series with the test connector 92. When the distribution board 130 is secured to the rear wall 62 of the chassis, the test connectors 90, 92 extend through openings 93 defined by the rear wall 62 so as to be accessible from the rear of the chassis 52 (see FIG. 3). The test connector 90 provides an interface location for connecting the splitter unit 50 to a test head or other testing device. The test connector 92 is preferably used to daisy chain multiple chassis together.

Figure 12:
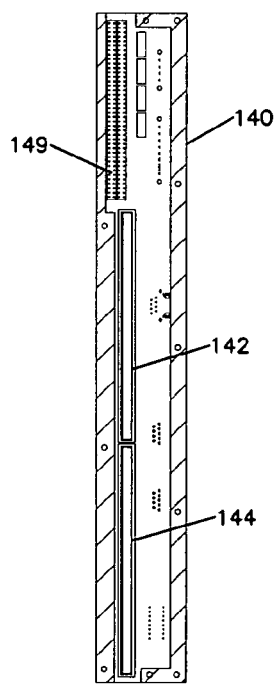
FIG. 12 is a front view of a central processing unit interface printed circuit board that is a component of the back plane of FIG. 7.

Referring now to FIGS. 5 and 7, the interface back plane 104 of the splitter unit 50 further includes structure for providing an interface with the CPU card 56 when the CPU card 56 is mounted at the CPU card mounting location 72. For example, the back plane 104 includes a CPU back plane circuit board 140 having a front side to which first and second interface connectors 142 and 144 are mounted (see FIGS. 12 and 13). The CPU back plane circuit board 140 mounts to the chassis behind the CPU card mounting location 72. When secured to the chassis 52, the circuit board 140 is generally parallel to the rear wall 62 of the chassis 52. The interface connectors 142 and 144 are depicted as card edge connectors adapted to receive corresponding first and second card edge extensions 146, 148 of the CPU card 56 when the CPU card 56 is mounted at the CPU card mounting location 72. A connector 149 including an array of conductive pins is also provided on the front side of the CPU back plane circuit board 140. The pins of the connector 149 are adapted to be received within corresponding receptacles of a connector 151 provided on the back side of the distribution circuit board 130. Thus, when the chassis 52 is assembled, the connectors 149 and 151 provide an electrical interface between the CPU back plane circuit board 140 and the distribution circuit board 130.

Figure 13:
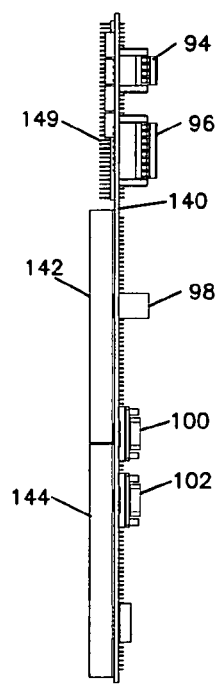
FIG. 13 is a side view of the central processing unit interface printed circuit board of FIG. 12.
Figure 14:
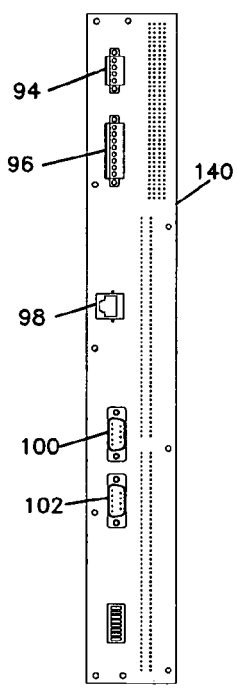
FIG. 14 is a back view of the central processing unit interface printed circuit board of FIG. 12.

As shown in FIGS. 13 and 14, a power connector 94, an alarm connector 96, an Ethernet connector 98, a serial port 100 and an auxiliary port 102 are mounted on the back side of the CPU back plane circuit board 140. As shown schematically in FIG. 20, the CPU back plane circuit board 140 includes tracings for electrically connecting the CPU interface connectors 142, 144 to the connectors 94, 96, 98, 100 and 102. When the splitter unit 50 is assembled, the back side of the CPU back plane circuit board 140 is covered by a panel 141 (see FIG. 3) that is separately removable from the rear wall 62 of the chassis 52. The panel 141 defines openings corresponding to each of the connectors 94, 96, 98, 100 and 102 such that the connectors are accessible from the rear of the chassis 52.

Referring again to FIGS. 5 and 7, one aspect of the splitter unit 50 is that the various back plane circuit boards are separately removable from the chassis 52. For example, each of the mini back plane circuit boards 116 is separately or individually removable from the chassis 52. Similarly, the distribution circuit board 130 as well as the CPU interface circuit board 140 are separately and individually removable from the chassis 52. By using a number of separately removable circuit boards at the interface back plane 104, repairs can be simplified because it is not necessary to remove a back plane board that corresponds to a large number of different type of components. Instead, only the board corresponding to the defective component need be removed and replaced.

Referring now to FIGS. 15-16, one of the splitter cards 54 is shown in isolation from the splitter chassis 52. The depicted splitter card 54 includes a plurality of splitters 182 (e.g., 24 splitters) mounted on a circuit board 184. The splitter card 54 also includes a front faceplate 186 mounted to a front edge of the circuit board 184. Retaining latches 188 are located at top and bottom edges of the faceplate 186 for retaining the splitter card 54 in the chassis 52. As previously indicated, the splitter card 54 also preferably includes first, second and third card edge extensions 112-114 located at a rear edge of the circuit board 184. The first extension 112 is rearwardly offset relative to the second and third extensions 113, 114. When the card 54 is fully inserted within a splitter card mounting location of the chassis 52, the extensions 112-114 are respectively received in the connectors 106-108 to provide an electrical interface between the splitter card 54 and the back plane 104 of the splitter unit 50. It will be appreciated that when the extensions 112-114 are received within the card edge connectors 106-108, springs of the connectors 106-108 engage conductive pads or contacts of the extensions 112-114 to provide electrical connections thereinbetween.

The splitters 182 of the splitter unit 50 can have a number of different configurations. For example, the splitters can include conventional POTS splitter circuits. A conventional POTS splitter circuit functions to split a signal (e.g., a signal from a DSL) into two signals. One of the split signals is typically passed through one or more low pass filters capable of passing the relatively lower frequency voice content of the signal (e.g., less than about 4 kilohertz) and rejecting signal content above the voice band (e.g., 30 kilohertz and above). This "voice-only" signal can then be transmitted from the splitter 182 to a voice switch such a voice switch 19. The other split signal can be transmitted from the splitter 182 to a DSLAM such as DSLAM 18. For such an embodiment, it is assumed that the DSLAM or other digital multi-plexer that ultimately receives the composite signal will provide any required high-pass filter elements to remove the relatively low frequency voice content of the composite signal. In other embodiments, high pass filtration can be done at the splitters 182. It will be appreciated that ISDN (integrated services digital network) filter circuits could also be used. Exemplary splitters/combiners incorporating low pass filters are sold by Vacuumschmelze GmbH of Germany.

It will be appreciated that signals are transmitted bi-directionally through the splitters 182. Thus, signals transmitted from DSLAMs and voice switches to the splitters 182 are combined at the splitters 182 such that the signals can be simultaneously routed to a subscriber 25 through a single DSL 13.

It is preferred for the splitter unit 50 to include test access devices that selectively provide test access through the test connector 90. In the preferred embodiment, selective test access is provided by relay switches provided on the splitter cards 54 (see FIG. 17). However, it will be appreciated that in other embodiments test access devices may be provided elsewhere within the splitter unit 50.

Figure 17:
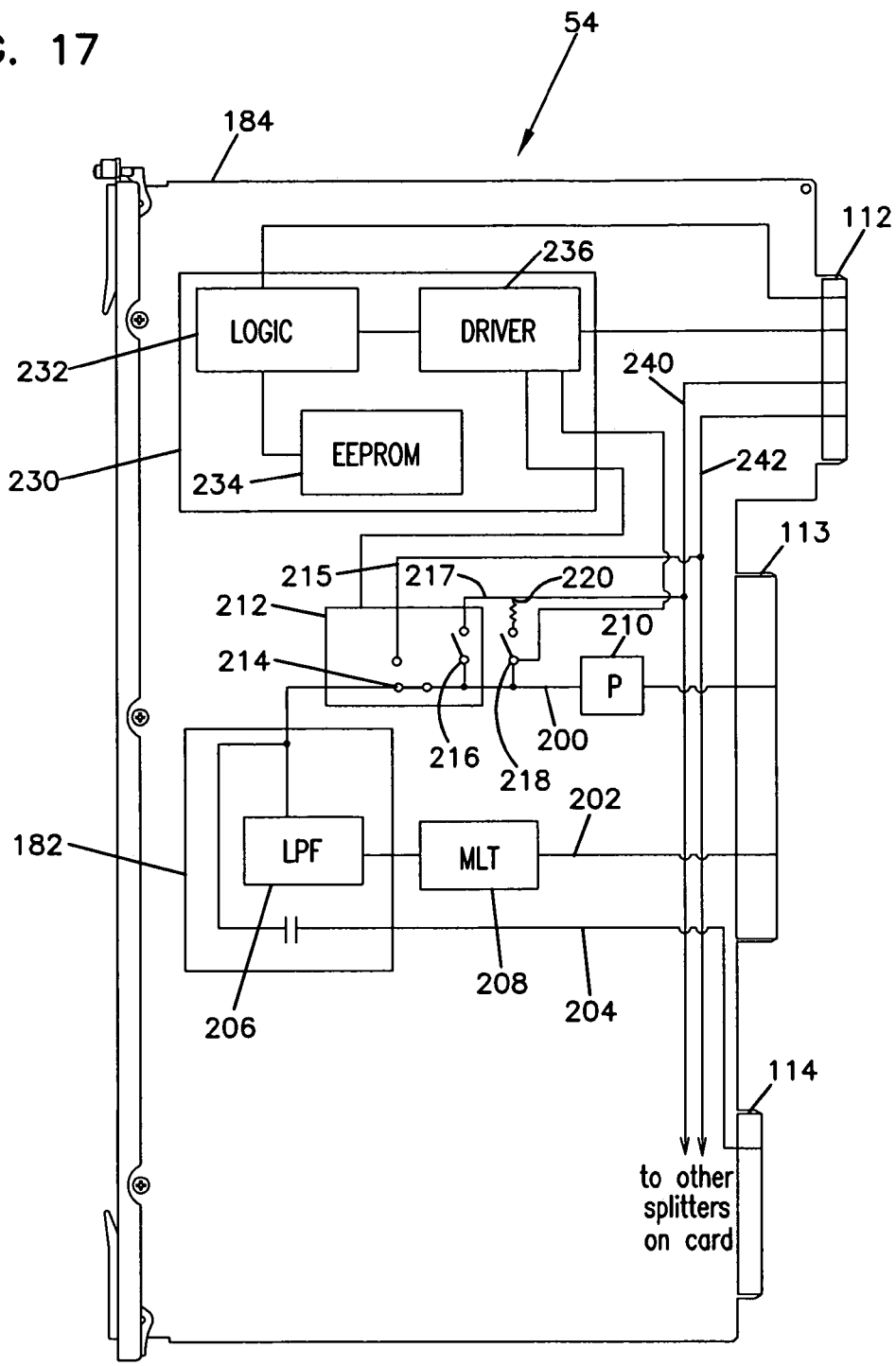
FIG. 17 provides a circuit schematic for one splitter of the splitter card of FIG. 15.

Referring to FIG. 17, a splitter and relay switch schematic is provided. It will be appreciated that in the embodiment of FIGS. 15 and 16, separate relay switch configurations are provided for each of the 24 splitters provided on the splitter card 54. However, for ease of explanation and clarity, only one of the splitters and its corresponding relay switch configuration are shown in FIG. 17.

Referring to FIG. 17, the splitter card 54 includes a LINE signal path 200 that extends from the card edge extension 113 to a splitter 182. At the splitter 182, the LINE signal path 200 splits into a VOICE signal path 202 that returns to the second card edge extension 113, and a DATA signal path 204 that extends to the third card edge extension 114. The splitter 182 includes a low pass filter 206 positioned along the VOICE signal path 202. A mechanized loop test signature 208 is also positioned along the VOICE signal path 202. While the various signal paths have been schematically depicted as single lines, since the system is preferably a twisted pair system, it will be appreciated that the single lines are each representative of a pair of paths.

An over voltage and overcurrent protector 210 is positioned along the LINE signal path 200 between the second card edge extension 113 and the splitter 182. Test access devices are also provided along the LINE signal path 200 between the second card edge extension 113 and the splitter 182. For example, the test access devices include a switching device 212 including two integral switches that are preferably concurrently actuated. The two switches include an upstream intrusive test switch 214 that opens and closes an upstream test access path 215, and a downstream intrusive test switch 216 that opens and closes a downstream test access path 217. The test access devices also include a monitor switch 218 that opens and closes a monitor test path 220.

The switching device 212 and the switch 218 are controlled by a switch controller 230 provided on the circuit board 184. The switch controller 230 preferably also controls all of the test access switches corresponding to the other 23 splitters which are not shown in FIG. 17. The switch controller 230 includes logic 232, memory 234 and a driver 236.

In FIG. 17, the switches 214, 216 and 218 are shown in their "normal" positions. The "normal" positions are the positions to which the switches 214, 216 and 218 return when not activated or when no power is being supplied to the splitter card 54. When the switches 214, 216 and 218 are in their "normal" positions, the monitor test path 220, the upstream test access path 215 and the downstream test access path 217 are open, and the switch 214 closes the LINE signal path 200 such that the LINE signal path 200 electrically connects the second card edge extension 213 to the splitter 182. To provide upstream and downstream intrusive test access, the switches 214 and 216 are moved to activated positions as shown in FIG. 22. When the switch 214 is activated, the LINE signal path 200 between the splitter 182 and the second card edge extension 113 is broken, and the splitter 182 is electrically connected to the upstream test access path 215. The upstream test access path 215 electrically connects to an upstream test bus 240 that extends to the first card edge extension 112. When the switch 214 is actuated, the switch 216 is also preferably simultaneously actuated. By actuating switch 216, the downstream test access path 217 is placed in electrical connection with the second card edge extension 113. The downstream test access path 217 is electrically connected to a downstream test bus 242 that extends to the first card edge extension 112. It will be appreciated that the test access switches corresponding to all of the splitters 182 are electrically connected to the upstream and downstream test buses 240 and 242 in the same manner as being representative test switches 214, 216 and 218 shown in FIG. 17.

Figure 18:
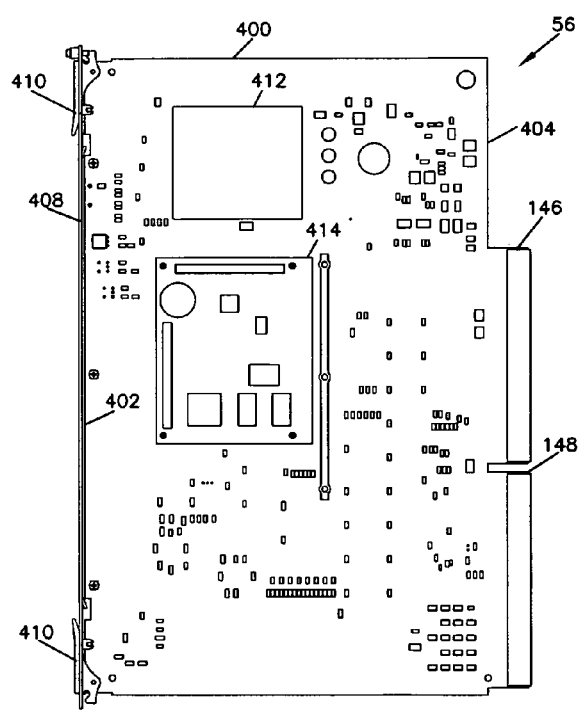
FIG. 18 is a side view of a central processing unit card that is a component of the splitter unit of FIG. 2.
Figure 19:
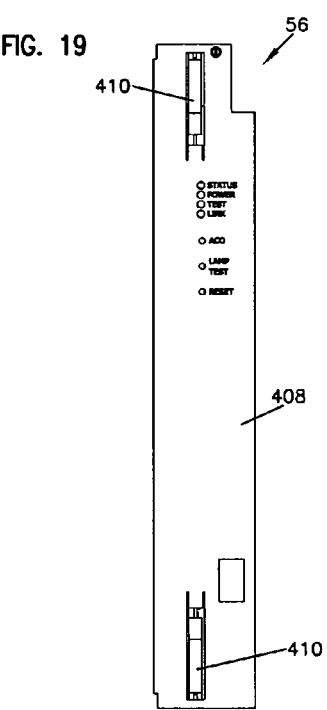
FIG. 19 is a front view of the central processing unit card of FIG. 18.

FIGS. 18 and 19 show the CPU card 56 in isolation from the chassis 52. The CPU card 56 includes a circuit board 400 having a front edge 402 and a rear edge 406. A faceplate 408 is mounted at the front edge 402. The faceplate 408 includes top and bottom latches 410 for securing the CPU card 56 within the chassis 52. When the CPU card mounting location 72 is vacant, a blank cover similar to the cover 408 can be used to enclose the front of the CPU card mounting location 72.

Referring to FIG. 18, the CPU card 56 includes a power/voltage converter 412 and a central processing unit 414 mounted on the circuit board 400. As shown schematically in FIG. 21, tracings are provided for electrically connecting the voltage converter 412 and the central processing unit 414 to the card edge extensions 146, 148 provided at the rear edge 406 of the circuit board 400.

A significant feature of the splitter unit 50 is that the splitters 182 of the splitter cards 54 are operational as telecommunications splitters regardless of whether the CPU card 56 is mounted in the CPU card mounting location 72 or not. FIG. 20 schematically shows the splitter unit 50 with the CPU card mounting location 72 vacant. In this configuration, no power is provided to the splitter cards 54 and no CPU is present for controlling the switch controllers 230. Therefore, with the CPU card mounting location 72 vacant, the test access switches 214, 216 and 218 assume their "normal" positions. With the switches 214, 216 and 218 in their "normal" positions as show in FIG. 20, no test access is provided. However, the line pathway 200 is closed such that the splitters 182 of the splitter cards 54 can still operate as passive splitters. For example, LINE signals can enter the splitter unit 50 through the LINE connector 76, and travel through the LINE pathway 200 to the splitter 182. At the splitter 182, the signal is passively split thereby causing a VOICE signal to be routed out of the splitter unit 50 through the VOICE connector 78 and a DATA signal to be routed out of the splitter unit through the DATA connector 80. Since the system is bi-directional, signals can also travel in the opposite direction. For example, signals input through the VOICE and DATA connectors 78 and 80 are combined at the splitter 182 and output through the LINE connector 76.

Figure 21:
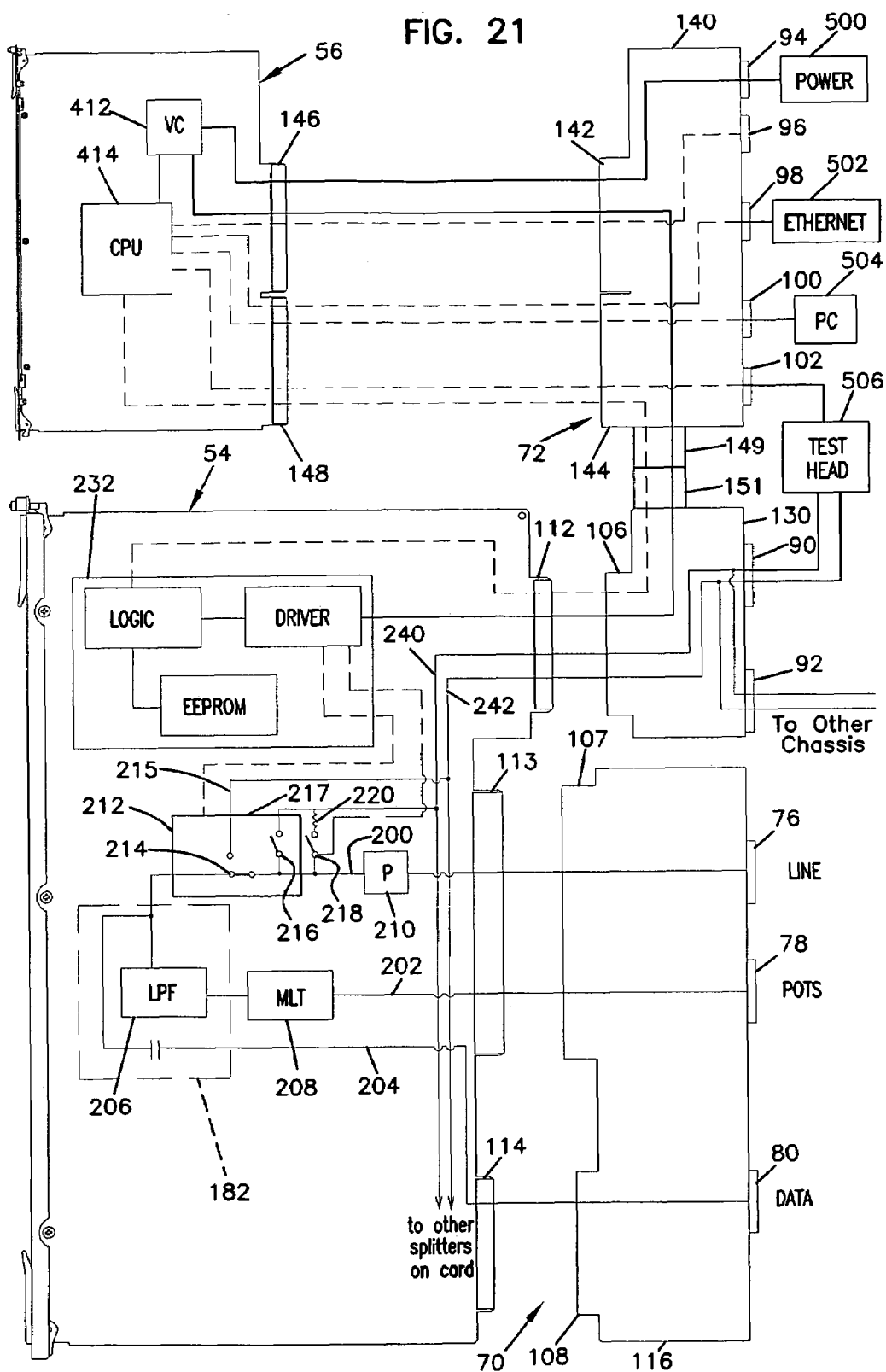
FIG. 21 is a schematic diagram of the splitter unit of FIG. 2 showing the central processing unit card mounted at the central processing unit card mounting location and with test relay switches of the system in normal positions.

FIG. 21 shows the splitter unit 50 with the CPU card 56 mounted at the CPU card mounting location 72. In FIG. 21, a power source 500 is connected to the power connector 94, the Ethernet 502 is connected to the Ethernet connector 98, a personal computer 504 is connected to the serial port 100, and a test head 506 connected to the auxiliary port 102 and the test head interface connector 90. It will be appreciated that test heads are known in the art and are commercially available from companies such as Harris Corporation of Melbourne, Fla. (e.g., the Harris 107A/S test head) or Spirent Communications.

With the CPU card 56 mounted at the CPU card mounting location 72, power from the power source 500 is routed through the voltage converter 412 of the CPU card 56 and to the splitter cards 54. Also, by linking the Ethernet 502 to the CPU 414, the switch controller 230 as well as the test head 506 can be controlled from a remote location. The personal computer 504 is linked to the CPU 414 to provide local control of the switch controllers 230 and the test head 506. The test head 506 is linked to the CPU through the auxiliary port 102. The presence of the CPU card 56 in the CPU card mounting location 72 allows a user to remotely or locally activate the switches 214, 216 and 218 when test access is desired or required.

In FIG. 21, the switches 214, 216 and 218 are still in their "normal" positions. FIG. 22 shows the switches 214 and 216 in activated positions. The switches can be activated by the switch controller 230 in response to control signals from the CPU 414. When the switches 214 and 216 are activated, intrusive upstream and downstream test access are provided. In other words, when the switches 214 and 216 are actuated, the LINE pathway 200 between the LINE connector 76 and the splitter 182 is broken, and the splitter 182 is instead linked to the test head 506 to provide upstream test access (see FIG. 22). Concurrently, the LINE connector 76 is also linked to the test head 506 to provide downstream test access (see FIG. 22).

FIG. 23 shows the switches 214 and 216 in their normal positions, and the switch 218 in the activated position. The switch 218 can be activated in response to control commands received by the switch controller 230 from the CPU 414. With the switch 218 activated, the monitor test path allows a monitor level signal to be provided to the test head 506 by the downstream bus 240.

It has been appreciated by the inventors that the configuration of the splitter unit 50 has advantages in the marketplace. Often, service providers prefer to defer as many costs as possible. When setting up an initial splitter system, it is sometimes not necessary to immediately provide test access. By providing a system that can operate as a passive splitter system without the presence of a CPU card, the cost of the CPU card and related firmware, hardware or software can be deferred until test access is desired or required. At the time test access is desired or required, it is not necessary to replace the existing splitter system or add a separate test access device to the system. Instead, the service provider need only purchase the CPU card which immediately upgrades the system from a passive splitter system to a splitter system with integral remote test access.

What is claimed is:

1. A telecommunications device comprising:
   an assembly including a chassis and sets of LINE, DATA and VOICE connectors, the chassis including splitter card mounting locations, the chassis also including at least one central processing unit card mounting location;
   telecommunication splitter cards that are each electrically connected to a corresponding set of the LINE, DATA and VOICE connectors when mounted at the splitter card mounting locations of the chassis, the splitter cards including test access devices that are inactive when the central processing unit card mounting location is vacant, the telecommunications splitter cards including telecommunications splitters that are operable even when the central processing unit card mounting location of the chassis is vacant; and
   a central processing unit card that mounts at the central processing unit card mounting location;
   wherein the telecommunications splitters are operable without requiring power to be supplied to the splitter cards, and wherein power is provided to the splitter cards when the central processing unit card is mounted at the central processing unit card mounting location.

2. The telecommunications device of claim 1 wherein the test access devices include test access switches controlled by the central processing unit card.

3. The telecommunications device of claim 1 wherein the splitter cards each include a plurality of the telecommunications splitters, wherein first and second test access switches are provided for each telecommunications splitter, and wherein the first test access switches provide upstream test access and the second test access switches provide downstream test access.

4. The telecommunications device of claim 3, wherein the assembly includes a test equipment connector and wherein the first and second test access switches move between normal and active positions, the splitters being electrically connected to corresponding LINE connectors and disconnected from the test equipment connector when corresponding first switches are in the normal positions, the splitters being electrically connected to the test equipment connector and disconnected from the corresponding LINE connectors when the corresponding first switches are in the active positions, the LINE connectors being disconnected from the test equipment connector when corresponding second switches are in the normal positions, and the LINE connectors being electrically connected to the test equipment connector when the corresponding second switches are in the active positions.

5. The telecommunications device of claim 4, further comprising third switches controlled by the central processing unit card for providing non-intrusive test access.

6. The telecommunications device of claim 5, wherein the first, second and third switches are provided on the splitter cards.

7. The telecommunications device of claim 1, wherein the chassis has a front side and a back side, wherein the sets of LINE, VOICE and DATA connecters are accessible from the back side and the splitter cards are inserted into the chassis through the front side.

8. The telecommunications device of claim 7, wherein the assembly includes a test equipment connector accessible from the back side of the chassis, and wherein each splitter card mounting location includes a first connector electrically connected to the test equipment connector.

9. The telecommunications device of claim 8, wherein each splitter card mounting location includes at least a second connector electrically connected to the LINE, VOICE and DATA connectors.

10. The telecommunications device of claim 8, wherein each splitter card mounting location includes second and third connectors, the second connector of each splitter mounting location being electrically connected to corresponding LINE and VOICE connectors, and the third connector of each splitter card mounting location being electrically connected to a corresponding DATA connector.

11. The telecommunications device of claim 10, further comprising back plane circuit boards corresponding to each of the splitter card mounting locations for electrically connecting the LINE, VOICE and DATA connectors to the second and third connectors, the back plane circuit boards each including front and rear edges, the back plane circuit boards being mounted adjacent the back side of the chassis, a set of the LINE, VOICE and DATA connectors being mounted adjacent the rear edge of each back plane circuit board, and a set of the second and third connectors being mounted adjacent the front edge of each back plane circuit board.

12. The telecommunications device of claim 11, further comprising a distribution circuit board mounted at the back side of the chassis for electrically connecting the first connectors to the test equipment connector.

13. The telecommunications device of claim 12, further comprising a central processing unit back plane circuit board and an interface connector mounted to the central processing unit back plane circuit board, the central processing unit back plane circuit board being electrically connected to the distribution circuit board, wherein the central processing unit card interconnects with the central processing unit back plane circuit board when the central processing unit card is mounted at the central processing unit card mounting location.

14. The telecommunications device of claim 13, wherein the distribution circuit board, the back plane circuit boards and the central processing unit back plane circuit board are separately removable from the chassis.

15. A telecommunications device comprising:
   a chassis including a plurality of splitter card mounting locations;
   at least one test equipment connector accessible from outside the chassis;
   sets of LINE, VOICE and DATA connectors accessible from outside the chassis;
   at least first and second connectors corresponding to each of the splitter card mounting locations, the first and second connectors being accessible from inside the chassis, the first connectors being electrically connected to the test equipment connector, the second connectors being electrically connected to at least the LINE and VOICE connectors;

telecommunications splitter cards mountable at the splitter card mounting locations of the chassis; and switches for selectively providing test access through the test equipment connector.

16. The telecommunications device of claim 15, further comprising third connectors corresponding to each of the splitter card mounting locations, the third connectors being accessible from inside the chassis and being electrically connected to the DATA connectors.

17. The telecommunications device of claim 15, further comprising a distribution circuit board for electrically connecting the test equipment connector to the first connectors.

18. The telecommunications device of claim 17, further comprising mini circuit boards corresponding each splitter card mounting location for electrically connecting the second connectors to at least their corresponding LINE and VOICE connectors.

19. The telecommunications device of claim 17, wherein the switches are provided on the splitter cards, and wherein power for actuating the switches is provided to the splitter cards through the distribution circuit board and the first connectors.

20. The telecommunications device of claim 17, further comprising a central processing unit interface circuit board and a central processing unit card that interfaces with the central processing unit interface circuit board, the central processing unit card including a central processing unit for controlling the switches on the splitter cards, the central processing unit interface circuit board being electrically connected to the distribution circuit board.

21. The telecommunications device of claim 18, further comprising a reinforcing bracket for maintaining a uniform spacing between the mini circuit boards.

22. A telecommunications device:

a circuit board including at least first and second card edge extensions;

at least one telecommunications splitter provided on the circuit board;

a plurality of test access switches provided on the circuit board; and a control device provided on the circuit board for opening an closing the test access switches;

wherein the test access switches include a first switch movable between a first position in which the splitter is electrically connected to the first card edge extension and disconnected from the second card edge extension, and a second position in which the splitter is electrically connected to the second card edge extension and disconnected from the first card edge extension.

23. The telecommunications device of claim 22, wherein the circuit board includes first, second and third card edge extensions.

24. The telecommunications device of claim 22, further comprising a second switch movable between a first position in which the second card edge extension is electrically connected to the first card edge extension, and a second position in which the second card edge extension is disconnected from the first card edge extension.

25. The telecommunications device of claim 24, further comprising a third switch for opening and closing a monitor line that extends to the first card edge extension.

26. A telecommunications device comprising:

an assembly including a chassis having a front side and a back side, sets of LINE, DATA and VOICE connectors accessible from the back side of the chassis, and a test equipment connector accessible from the back side of the chassis, the chassis including splitter card mounting locations each having first, second, and third connectors, the chassis also including at least one central processing unit card mounting location;

a distribution circuit board mounted at the back side of the chassis for electrically connecting the first connectors to the test equipment connector;

back plane circuit boards corresponding to each of the splitter card mounting locations for electrically connecting the LINE, VOICE and DATA connectors to the second and third connectors, the back plane circuit boards each including front and rear edges, the back plane circuit boards being mounted adjacent the back side of the chassis, a set of the LINE, VOICE and DATA connectors being mounted adjacent the rear edge of each back plane circuit board, and a set of the second and third connectors being mounted adjacent the front edge of each back plane circuit board; and telecommunication splitter cards inserted into the chassis through the front side, each splitter card electrically connected to a corresponding set of the LINE, DATA and VOICE connectors when mounted at the splitter card mounting locations of the chassis, the splitter cards including test access devices that are inactive when the central processing unit card mounting location is vacant, the telecommunications splitter cards including telecommunications splitters that are operable even when the central processing unit card mounting location of the chassis is vacant.

27. The telecommunications device of claim 26, further comprising a central processing unit back plane circuit board and an interface connector mounted to the central processing unit back plane circuit board, the central processing unit back plane circuit board being electrically connected to the distribution circuit board, the assembly also including a central processing unit card the interconnects with the central processing unit back plane circuit board when the central processing unit card is mounted at the central processing unit card mounting location.

28. The telecommunications device of claim 27, wherein the distribution circuit board, the back plane circuit boards and the central processing unit back plane circuit board are separately removable from the chassis.

* * * * *

UNITED STATES PATENT AND TRADEMARK OFFICE
CERTIFICATE OF CORRECTION

PATENT NO. : 7,463,722 B2  
APPLICATION NO. : 10/277172  
DATED : December 9, 2008  
INVENTOR(S) : Swam et al.

Page 1 of 1

It is certified that error appears in the above-identified patent and that said Letters Patent is hereby corrected as shown below:

Col. 10, line 9, claim 7: "DATA connecters are accessible" should read --DATA connectors are accessible--

Col. 11, line 45, claim 22: "an closing the test" should read --and closing the test--

Col. 12, line 48, claim 27: "card the interconnects" should read --card that interconnects--

Signed and Sealed this  
Fifth Day of February, 2013

Teresa Stanek Rea  
*Acting Director of the United States Patent and Trademark Office*